(12) United States Patent
Morrow et al.

(10) Patent No.: US 7,279,643 B2
(45) Date of Patent: *Oct. 9, 2007

(54) TONEABLE CONDUIT AND METHOD OF PREPARING SAME

(75) Inventors: Jason Norman Morrow, Taylorsville, NC (US); Robert Miller Ward, Jr., Hickory, NC (US); Zeb Leonard Kale, Hiddenite, NC (US); Michael Ray Bailey, Statesville, NC (US); Christopher Gemme, Hickory, NC (US); George Bollinger, Claremont, NC (US); Scott Lumley, Taylorsville, NC (US)

(73) Assignee: Commscope Solutions Properties, LLC, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,654

(22) Filed: May 22, 2006

(65) Prior Publication Data

US 2006/0210750 A1    Sep. 21, 2006

Related U.S. Application Data

(60) Continuation of application No. 10/830,754, filed on Apr. 23, 2004, which is a division of application No. 10/158,810, filed on May 30, 2002, now abandoned, which is a continuation-in-part of application No. 09/989,289, filed on Nov. 20, 2001.

(51) Int. Cl.
    *H02G 3/08* (2006.01)
(52) U.S. Cl. .................. 174/481; 174/98; 174/68.3; 138/104
(58) Field of Classification Search ........... 174/481.98, 174/68.3, 112, 72 R, 97; 138/104, 110
    See application file for complete search history.

(56) References Cited

U.S. PATENT DOCUMENTS 2,722,237 A    11/1955    Rosel (Continued)

FOREIGN PATENT DOCUMENTS

DE    2248441    4/1974

(Continued)

OTHER PUBLICATIONS

International Search Report from corresponding International Application No. PCT/US02/37417 dated Mar. 21, 2003.

*Primary Examiner*—Dhiru R. Patel
(74) *Attorney, Agent, or Firm*—Scott L. Lowe

(57) ABSTRACT

The invention is a toneable conduit that can transmit a signal and be readily detected by toning equipment. The conduit can be coupled with other conduit to provide extended lengths of conduit. The toneable conduit includes an elongate polymeric tube having a wall with an interior surface, an exterior surface, and a predetermined wall thickness. A channel preferably extends longitudinally within the wall of the elongate polymeric tube; a stabilizing rib extends longitudinally along the interior surface of the wall of the elongate polymeric tube and is located radially inward from the channel. A continuous wire is coincident with the channel in the elongate polymeric tube and preferably coated with a composition that prevents it from adhering to the polymer melt that forms the elongate polymeric tube. The present invention includes methods of making the toneable conduit and methods of coupling a first toneable conduit with a second toneable conduit.

33 Claims, 7 Drawing Sheets

U.S. PATENT DOCUMENTS

| | | | |
|---|---|---|---|
| 3,367,370 A * | 2/1968 | Sherlock | 138/104 |
| 3,555,170 A | 1/1971 | Petzetakis | |
| 3,580,983 A | 5/1971 | Jackson | |
| 4,109,941 A | 8/1978 | Wood et al. | |
| 5,006,806 A | 4/1991 | Rippingale et al. | |
| 5,017,873 A | 5/1991 | Rippingale et al. | |
| 5,045,368 A | 9/1991 | Cosman et al. | |
| 5,051,034 A | 9/1991 | Goodman | |
| 5,114,517 A | 5/1992 | Rippingale et al. | |
| 5,212,349 A * | 5/1993 | Pelzer | 174/98 |
| 5,227,103 A * | 7/1993 | Muschiatti | 264/45.9 |
| 5,243,128 A | 9/1993 | Marcoz | |
| RE34,701 E | 8/1994 | Goodman | |
| 5,415,242 A | 5/1995 | Pelzer | |
| 5,532,598 A | 7/1996 | Clark, Jr. et al. | |
| 5,812,358 A | 9/1998 | Kawai et al. | |
| 5,998,081 A * | 12/1999 | Morrison et al. | 430/117 |
| 6,005,191 A * | 12/1999 | Tzeng et al. | 174/102 R |
| 6,053,457 A * | 4/2000 | Ozga et al. | 248/58 |
| 6,068,426 A | 5/2000 | Blanquet et al. | |
| 6,092,558 A | 7/2000 | Maccario | |
| 6,105,649 A * | 8/2000 | Levingston et al. | 156/425 |
| 6,131,265 A * | 10/2000 | Bird | 29/507 |
| 6,135,159 A | 10/2000 | Karl | |
| 6,139,068 A | 10/2000 | Burress et al. | |
| 6,139,957 A * | 10/2000 | Craton | 428/379 |
| 6,933,438 B1 | 8/2005 | Watts et al. | |

FOREIGN PATENT DOCUMENTS

| | | |
|---|---|---|
| EP | 159307 A1 | 10/1985 |
| EP | 0449795 | 10/1991 |
| GB | 2 197 419 | 5/1988 |
| JP | 03-270789 | 4/1993 |
| JP | 05-106765 A | 4/1993 |
| JP | 05-106766 A | 4/1993 |
| JP | 05-106779 A | 4/1993 |
| JP | 05106779 A * | 4/1993 |
| RU | 2246068 | 4/2000 |
| WO | WO 96/15894 A | 5/1996 |

* cited by examiner

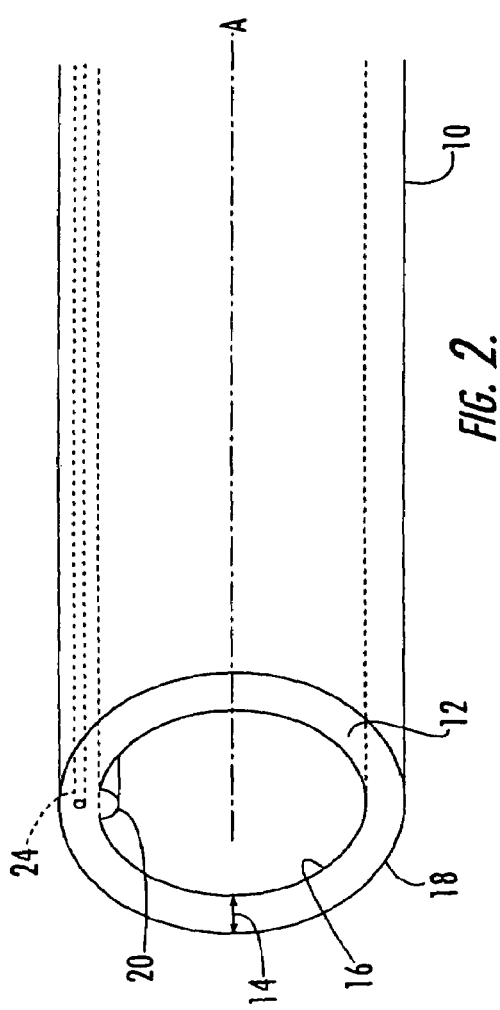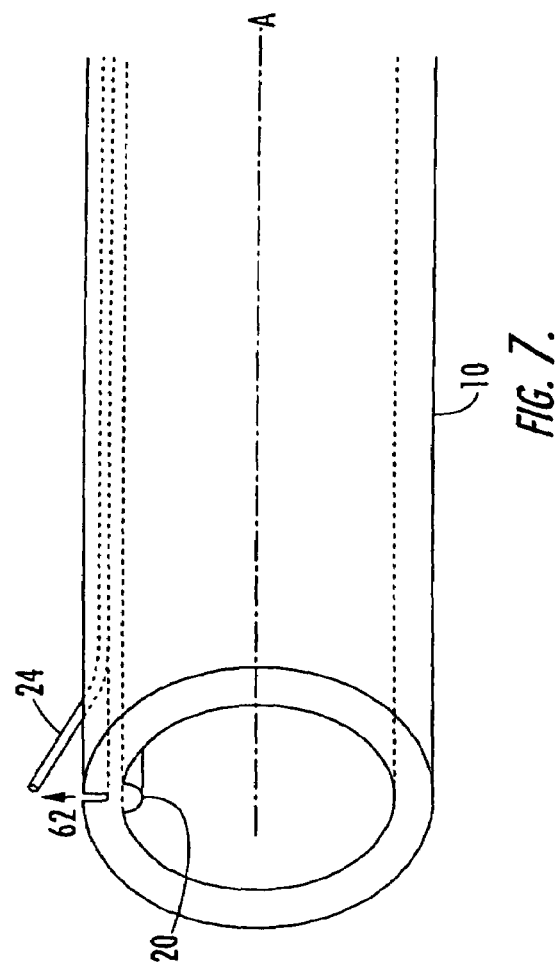

TONEABLE CONDUIT AND METHOD OF PREPARING SAME

CROSS REFERENCE TO RELATED APPLICATIONS

This application is a continuation of copending U.S. patent application Ser. No. 10/830,754, filed Apr. 23, 2004, which is a divisional of U.S. patent application Ser. No. 10/158,810, filed May 30, 2002 now abandoned, which is a continuation-in-part of copending U.S. patent application Ser. No. 09/989,289, filed Nov. 20, 2001.

FIELD OF THE INVENTION

The present invention relates to toneable conduit and more particularly to toneable conduit that can be detected by conventional toning equipment and that includes a wire that is capable of being torn out of the conduit to allow the conduit and wire to be coupled.

BACKGROUND OF THE INVENTION

Conduit is often buried to provide an underground path for cables such as coaxial cables and fiber optic cables. In particular, conduit is typically formed of a plastic material that protects the coaxial cables and fiber optic cables from the moisture and other hazards of the underground environment. The cable is typically installed in the conduit by pulling the cable through the conduit although the cable can be provided in the conduit when it is installed underground.

One issue with conduit is that it can be difficult to locate underground when it is either empty or it contains a non-metallic cable, such as a fiber optic cable. As a result, conduit has often been outfitted with a metallic or magnetic strip or wire that allows the conduit to be detected by metal detecting equipment on the ground surface. Although these types of detection devices are useful, they cannot always locate conduit that is buried deep underground (e.g. greater than 5 feet). As an alternative to these types of detection devices, toning equipment is commonly used that operates by transmitting a signal along a metallic wire or strip associated with the conduit and detecting the signal from the ground surface.

One conventional conduit construction that can be detected by conventional metal detection devices and even the toning devices discussed above includes an exterior rib that houses the metallic ribbon or wire. For example, Japanese published application JP 5-106765 describes an embodiment that includes an exterior rib including a conductive wire. Although these types of constructions have found use, it is difficult to couple this conduit with another conduit because the exterior rib prevents the connector from fitting flush onto the conduit. As a result, moisture can enter the conduit at the connection and can cause damage to the cable installed therein. In addition, the exterior rib can cause problems during installation in that the exterior rib and associated wire can be ripped off of the conduit if the conduit is being installed by directional boring or plowing methods.

Another conduit construction that is designed to be detected by metal detection devices includes a metallic ribbon or wire that is provided at intermittent lengths. For example, U.S. Pat. No. 6,092,558 describes such an embodiment wherein discrete lengths of a magnetic strip are spaced apart longitudinally along the conduit. U.S. Pat. No. 5,045,368 also describes a similar construction having markers at intervals along the length of the conduit. Although this type of conduit can be detected by the metal detection devices discussed above, it cannot be detected by conventional toning equipment because a signal cannot be transmitted along the conduit.

Alternatively, some conduit constructions use continuous lengths of strip or ribbon formed of metal or a magnetic material to allow the conduit to be detected by metal detecting equipment. For example, U.S. Pat. Nos. 5,051,034 and RE 34,701 describe this type of construction and use a ribbon of magnetic material to allow the conduit to be detected at three to five feet underground. U.S. Pat. Nos. 5,006,086, 5,017,873 and 5,114,517 use a magnetic ribbon that is spirally wound around the exterior surface of the conduit. Although the strip or ribbon in these constructions can be detected by conventional metal detecting equipment, it does not have a suitable construction for transmitting a toning signal for extended distances and at the depths desired in the art.

As demonstrated above, there is a need in the art to provide a conduit that can be detected by toning equipment for extended distances and at the depths desired in the art. In addition, there is a need in the art to provide conduit that can be coupled to provide extended lengths of underground conduit that can be detected by toning equipment.

SUMMARY OF THE INVENTION

The present invention provides a conduit that can transmit a signal over great distances and that can therefore be readily detected by toning equipment. In addition, the conduit of the invention can be readily coupled to provide extended lengths of conduit. In particular, the present invention uses a continuous wire to provide the toning signal that is capable of being torn out through the conduit to allow the conduit to be coupled over extended lengths by forming an electrical connection between the wire of adjacent segments of conduit. In addition, the connectors used for the conduit can be connected flush against the exterior surface of the conduit to prevent the leakage of moisture into the conduit and thus prevent damage to the cable within the conduit. The conduit of the invention also has excellent crush strength as is desired in the art. The conductive wire also includes a coating that allows the conductive wire to be protected in the underground environment and that facilitates the continuous production of the conduit of the invention.

The above advantages are achieved through the use of a toneable conduit that includes an elongate polymeric tube having a wall with an interior surface, an exterior surface, and a predetermined wall thickness. A channel extends longitudinally within the wall of the elongate polymeric tube and a stabilizing rib preferably extends longitudinally along the interior surface of the wall of the elongate polymeric tube and is located radially inward from the channel. A continuous wire is coincident with the channel in the elongate polymeric tube and is preferably coated with a coating composition that prevents the wire from adhering to the polymer melt used to form the elongate polymeric tube. Preferably, the wire has a tensile strength of at least about 150 lbs. and is preferably a copper-clad steel wire, copper-clad aluminum wire, copper wire or tin copper wire. More preferably, the wire is copper-clad steel wire. The wire also preferably has a diameter from about 0.32 mm to about 2.59 mm. More preferably, the wire has a diameter of 1.02 mm. In accordance with the invention, the wire is capable of transmitting a toning signal to allow the conduit to be detected by toning equipment and is capable of being torn out of the polymeric tube to allow the conduit to be coupled.

The wire is preferably coated with a coating composition that is formed of a high melting temperature polymeric material, preferably having a melting temperature of at least about 500° F. Preferably, the high melting temperature polymeric material is selected from the group consisting of fluoropolymers, polyamides, polyesters, polycarbonates, polypropylene, polyurethanes, polyacetals, polyacrylics, epoxies and silicone polymers and is more preferably polytetrafluoroethylene. Preferably, the conduit is formed of polyethylene or polyvinyl chloride and more preferably high-density polyethylene (HDPE). The conduit also preferably has a smooth exterior surface and can further include at least one additional rib (in addition to the stabilizing rib) extending longitudinally along the interior surface of the elongate polymeric tube to facilitate the installation of cable within the conduit.

According to an alternative embodiment of the invention, the toneable conduit can further include a second channel that extends longitudinally within the wall of the elongate polymeric tube. A conductor can be provided coincident with the second channel such as a continuous wire like the one discussed above or a twisted pair of continuous wires to provide a return path for signals that can be used to monitor the status of the cable. A second stabilizing rib can also extend longitudinally along the interior surface of the wall of the elongate polymeric tube and can be located radially inward from the second channel.

The present invention further includes a method of making toneable conduit, comprising the steps of advancing a continuous wire and extruding a polymer melt around the advancing wire in the form of an elongate polymeric tube having a wall of a predetermined thickness, an interior surface, an exterior surface, and a stabilizing rib extending longitudinally along the interior surface of the wall of the elongate polymeric tube such that the wire is embedded in the wall of the elongate polymeric tube and the stabilizing rib is located radially inward from the wire. In accordance with the invention, the advancing step comprises advancing a wire coated with a coating composition that prevents the wire from adhering to the polymer melt used in said extruding step. Preferably, the polymer melt extruded into the form of an elongate polymeric tube through the use of a die and a tip, wherein a groove in said tip forms the stabilizing rib on the interior surface of the conduit. A wire is preferably advanced through a wire guide tube into the polymer melt. A conductor such as an additional continuous wire or a twisted pair of continuous wires can also be advanced into the polymer melt and the polymer melt extruded around the advancing wire and the advancing conductor. The method of the invention can also include forming additional ribs extending longitudinally along the interior surface of the elongate polymeric tube in the extruding step to facilitate the installation of cable into the conduit. The wire that is advanced into the polymer melt preferably has a tensile strength of at least about 150 lbs. In particular, the wire is preferably a copper-clad steel wire, copper-clad aluminum wire, copper wire or tin copper wire and is more preferably copper-clad steel wire, and preferably has a diameter of from about 0.32 mm to about 2.59 mm. The wire is also preferably coated with a coating composition formed of a polymeric material selected from the group consisting of fluoropolymers, polyamides, polyesters, polycarbonates, polypropylene, polyurethanes, polyacetals, polyacrylics, epoxies and silicone polymers. Preferably, the polymeric material has a melting temperature of at least about 500° F., and is more preferably polytetrafluoroethylene. The polymer melt is preferably extruded in the form of an elongate polymeric tube having a smooth exterior surface.

The present invention also includes a method of coupling a first toneable conduit with a second toneable conduit, comprising the steps of providing a first toneable conduit as discussed above and providing a second toneable conduit as discussed above, tearing the wire of the first toneable conduit through the exterior surface of the first toneable conduit, tearing the wire of the second toneable conduit through the exterior surface of the second toneable conduit, mechanically connecting the first and second toneable conduits, and electrically connecting the wire from the first toneable conduit and the wire from the second toneable conduit. In addition, the first and second toneable conduits can include a second channel and a conductor such as a second continuous wire or a twisted pair of continuous wires coincident with the second channel and the conductors in the first and second toneable conduits can also be torn through the exterior surface of the toneable conduits and electrically connected with one another.

These and other features and advantages of the present invention will become more readily apparent to those skilled in the art upon consideration of the following detailed description and accompanying drawings, which describe both the preferred and alternative embodiments of the present invention.

BRIEF DESCRIPTION OF THE DRAWINGS

FIG. 2 is a side view of the toneable conduit illustrated in FIG. 1 according to the present invention.

FIG. 7 is a side view of the toneable conduit according to the present invention wherein the wire has been torn through the exterior surface of the conduit.

DETAILED DESCRIPTION OF THE PREFERRED EMBODIMENTS

Figure 1:
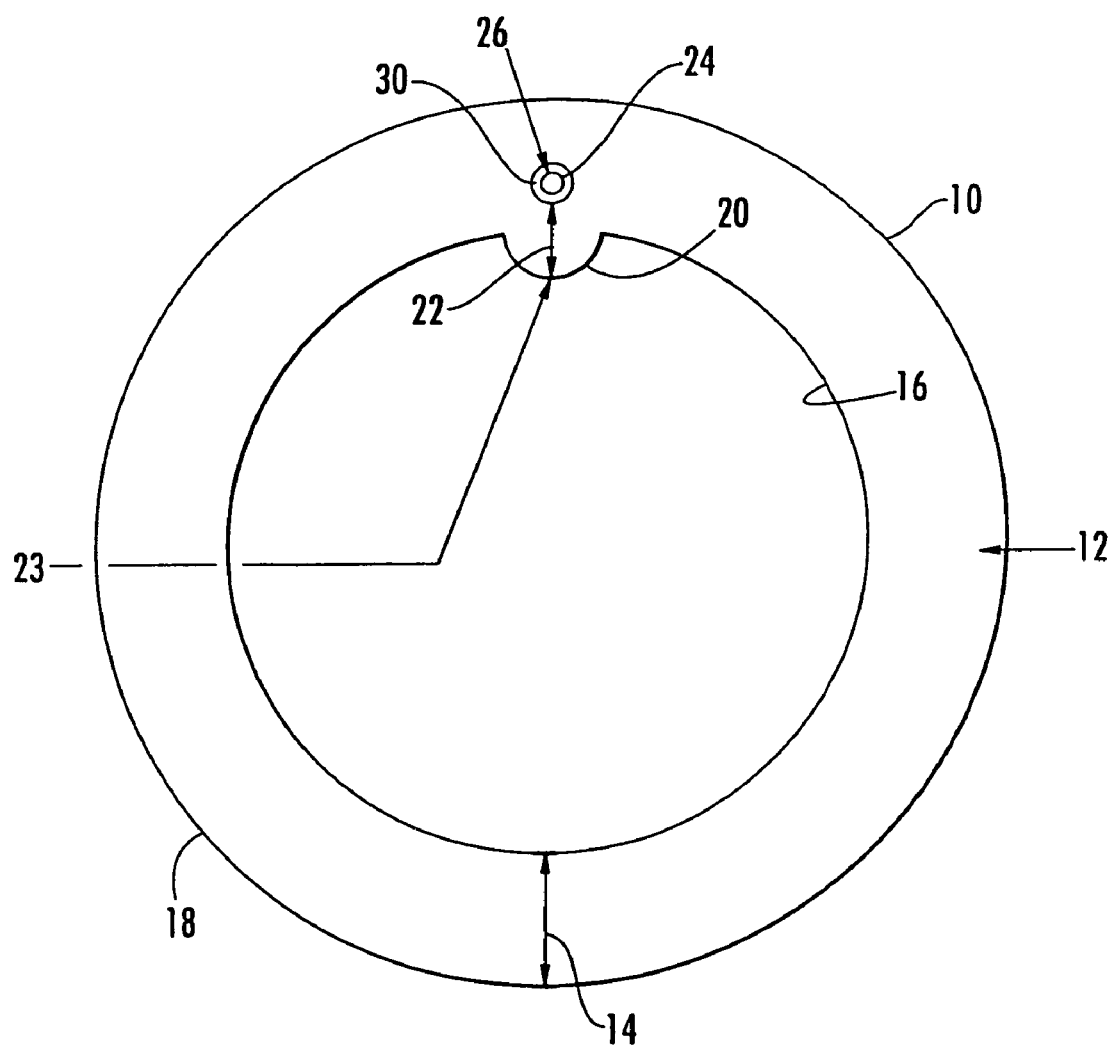
FIG. 1 is a cross-sectional view of a toneable conduit according to the present invention.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings, like numbers refer to like elements throughout.

FIGS. 1 and 2 illustrate a toneable conduit according to the present invention. As shown in these figures, the conduit is formed of an elongate polymeric tube 10 that includes a wall 12 having a predetermined thickness 14 and further includes an interior surface 16 and an exterior surface 18. The exterior surface 18 is preferably smooth so that the conduit can be effectively coupled as discussed in more detail below. The conduit can be formed of any suitable polymeric (i.e. plastic) material and suitable polymeric materials for conduit are known in the art such as polyethylene or polyvinyl chloride. Preferably, the elongate polymeric tube 10 is formed of high density polyethylene (HDPE). The polymeric material can also be blended with certain additives, e.g., for UV protection. The wall 12 of the elongate polymeric tube 10 typically has a predetermined thickness 14 of from about 0.05 inches to about 0.75 inches. Moreover, the elongate polymer tube 10 typically has a nominal inside diameter of from about 0.5 inches to about 6.5 inches.

The toneable conduit preferably includes a stabilizing rib 20 that extends longitudinally along the interior surface 16 of the elongate polymeric tube 10. As shown in FIGS. 1 and 2, the stabilizing rib 20 is integral with the elongate polymeric tube 10 and formed of the same material as the elongate polymeric tube. The stabilizing rib 20 maintains the wall thickness 14 of the conduit when the wire is torn out of the conduit as discussed in more detail below such that it can withstand the forces typically associated with installation, use and transport of the conduit. Typically, the stabilizing rib 20 extends from the interior surface 16 of the elongate polymeric tube 10 such that the distance 22 from the wire to the interior edge 23 of the stabilizing rib is at least equal to the wall thickness 14. The stabilizing rib 20 is also located radially inward from the wire used in the invention. The stabilizing rib 20 illustrated in FIGS. 1 and 2 has a generally semicylindrical shape (i.e. an arcuate cross-section) but can have a rectangular or trapezoidal shape, for example, so long as it provides the desired amount of strength and stability to the conduit wall 12. In addition to the stabilizing rib 20, the conduit can include additional ribs (not shown) extending longitudinally along the interior surface 16 of the elongate polymeric tube 10 and integral with the elongate polymeric tube to facilitate the installation of cable in the conduit by decreasing the surface area in contact between the interior surface of the elongate polymeric tube and the cable.

As shown in FIGS. 1 and 2, the toneable conduit includes a wire 24 that extends longitudinally along the length of the elongate polymeric tube 10 and is coincident with a channel the extends longitudinally within the wall 12 of the elongate polymeric tube 10. The wire 24 runs continuously along the length of the elongate polymeric tube 10 and is embedded within the wall 12 of the elongate polymeric tube. In particular, the wire 24 is typically provided completely within the wall 12 of the elongate polymeric tube 10. Preferably, the wire 24 extends parallel to a central longitudinal axis A of the elongate polymeric tube 10.

The wire 24 possesses sufficient tensile strength and elongation to allow the wire to be torn out through the exterior surface 18 of the elongate polymeric tube 10 (e.g., by using a pair of pliers). The wire 24 used in the invention preferably has a tensile strength of at least about 150 lbs. as measured according to ASTM method B869. In addition, the wire 24 preferably has an elongation of at least about 1% as measured according to ASTM methods B3 and B869. The wire 24 is preferably a copper-clad steel wire, copper-clad aluminum wire, copper wire or tin copper (tin-clad copper) wire. More preferably, the wire 24 is a copper-clad steel wire. The wire 24 preferably has a diameter of from 0.32 mm (28 gauge) to 2.59 mm (10 gauge), and more preferably is a copper-clad steel wire having a diameter of 1.02 mm (18 gauge).

As mentioned above, the wire 24 runs continuously along the length of the elongate polymeric tube 10 and thus it can transmit a toning signal along the length of the conduit to allow the underground conduit to be detected from the surface by toning equipment. Moreover, because of the "skin effect" associated with signal transmission as understood by those skilled in the art, the signal is transmitted along the outer surface 26 of wire 24 and thus takes advantage of the conductivity of the copper portion present in the preferred wires used with the invention. As a result, the wire 24 of the conduit can transmit signals over long distances as desired in the art (e.g. at least 5 miles). It has been discovered that a larger diameter wire 24 (e.g. 18 gauge) transmits a toning signal over longer distances than a smaller diameter wire. Moreover, a larger diameter wire 24 is stronger than a smaller diameter wire and thus can more effectively be torn out of the conduit when it is coupled with other conduit.

The wire 24 is coated with a layer 30 of a coating composition. The coating composition layer 30 typically has a thickness of from about 1 to about 15 mils, and is more preferably about 8 mils. The coating composition layer 30 is formed of a material that prevents the wire 24 from adhering to the polymer melt used to form the elongate polymeric tube 10. Accordingly, the coating composition layer 30 is typically formed of a polymeric material that has a melting temperature above the temperature of the polymeric melt so that is does not melt during the formation of the elongate polymeric tube 10. Preferably, the coating composition layer 30 is formed of fluoropolymers (e.g. polytetrafluoroethylene (PTFE), fluorinated ethylene-propylene (FEP), ethylenetrifluoroethylene (ETFE), and ethylenechlorotrifluoroethylene (ECTFE), polyvinyl fluoride (PVF) and polyvinylidene fluoride (PVDF)); polyamides (e.g. nylon); polyesters (e.g. polyethylene terephthalate (PET)); polycarbonates; polypropylene; polyurethanes; polyacetals; polyacrylics; epoxies; silicone polymers; and mixtures thereof. The high melting temperature polymeric materials used in the coating preferably has a melting temperature of at least about 500° F. More preferably, the coating composition layer 30 is formed of a fluoropolymer and is more preferably polytetrafluoroethylene (TEFLON®). Advantageously, because the wire 24 is coated with polytetrafluoroethylene, it also protects the wire 24 from the underground environment when it is torn out of the conduit and electrically connected to the wire from an adjacent conduit as discussed in more detail below. In particular, the coating composition layer 30 preferably provides corrosion resistance to the wire 24.

Although not illustrated in FIGS. 1 and 2, the conduit of the invention can include one or more cables such as coaxial cables, fiber optic cables, twisted pair cables, electrical cables, support or messenger cables, and the like. The advantages of the invention are particularly evident when toning equipment is used to locate empty conduit (not including any cable) or conduit containing non-metallic cable such as fiber optic cable as metallic cable can be detected underground without the need to use the conduit of the invention. Nevertheless, the conduit of the invention can be used to house metallic cable such as coaxial cable.

Figure 3:
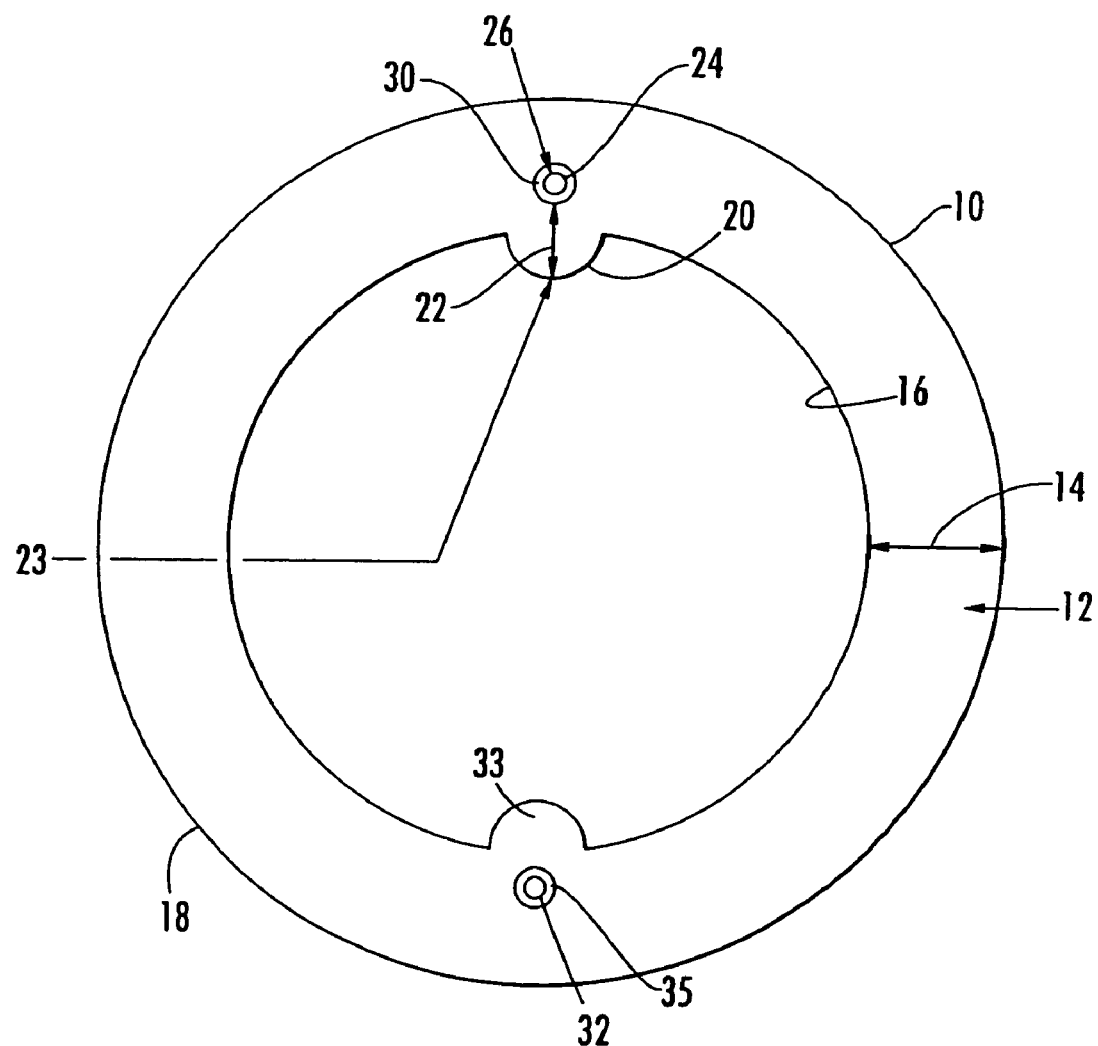
FIG. 3 is a cross-sectional view of a toneable conduit according to an alternative embodiment of the present invention further including an additional continuous, high tensile strength wire.
Figure 4:
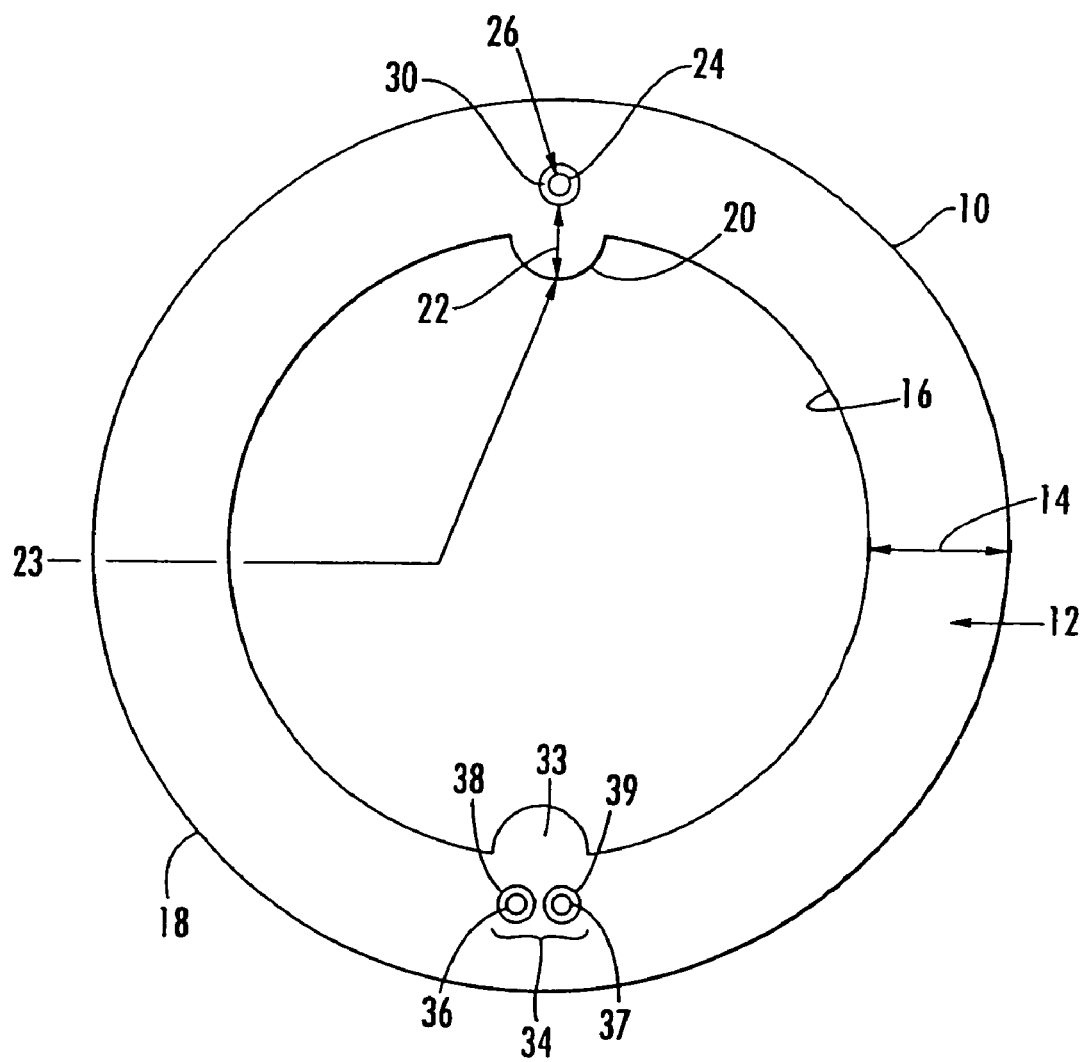
FIG. 4 is a cross-sectional view of a toneable conduit according to an alternative embodiment of the present invention further including a twisted pair of wires.

FIGS. 3 and 4 illustrate toneable conduits according to alternative embodiments of the invention. As shown in FIGS. 3 and 4, the toneable conduit can further include a conductor such as a second continuous wire 32 (FIG. 3) or a twisted pair of continuous wires 34 (FIG. 4) that extends longitudinally along the length of the elongate polymeric tube 10. The conductor is coincident with a channel that extends longitudinally within the wall 12 of the elongate polymeric tube 10 and that is typically different than the channel that is coincident with the wire 24. The conductor runs continuously along the length of the elongate polymeric tube 10 and is embedded within the wall 12 of the elongate polymeric tube. In particular, the conductor is typically provided completely within the wall 12 of the elongate polymeric tube 10. Preferably, the conductor extends parallel to a central longitudinal axis A of the elongate polymeric tube 10. As shown in FIGS. 3 and 4, the toneable conduit can also include a stabilizing rib 33 that is located radially inward from the conductor used in the invention in the same manner as the stabilizing rib 20.

Like the wire 24, the wire 32 illustrated in FIG. 3 possesses sufficient tensile strength and elongation to allow the wire to be torn out through the exterior surface 18 of the elongate polymeric tube 10. The wire 32 preferably has a tensile strength of at least about 150 lbs. as measured according to ASTM method B869. In addition, the wire 32 preferably has an elongation of at least about 1% as measured according to ASTM methods B3 and B869. The wire 32 is preferably a copper-clad steel wire, copper-clad aluminum wire, copper wire or tin copper (tin-clad copper) wire. More preferably, the wire 32 is a copper-clad steel wire. The wire 32 preferably has a diameter of from 0.32 mm (28 gauge) to 2.59 mm (10 gauge), and more preferably is a copper-clad steel wire having a diameter of 1.02 mm (18 gauge). The wire 32 is also preferably coated with a layer of a coating composition 35 like the coating composition described above with respect to the wire 24.

Each of the wires 36 and 37 in the twisted pair of continuous wires 34 illustrated in FIG. 4 preferably has sufficient tensile strength and elongation to allow the twisted pair of wires to be torn out through the exterior surface 18 of the elongate polymeric tube 10. For example, the continuous wires 36 and 37 used in the twisted pair of continuous wires 34 can be formed of the wire described above with respect to the wire 24. In addition, the wires 36 and 37 are also preferably coated with a layer of a coating composition 38 and 39 like the coating composition described above with respect to the wire 24.

As mentioned above, the wire 32 and the twisted pair of wires 34 run continuously along the length of the elongate polymeric tube 10. Thus, the wire 32 and the twisted pair of wires 34 can provide a return path for signals that can be used to monitor the status of the cable. For example, the wire 32 and the twisted pair of wires 34 can be used with time-domain reflectometer (TDR) devices to determine if there are damage points along the length of the conduit. As is well understood to those skilled in the art, TDR devices are meters with an oscilloscope-type display that send out a pulse along a line of cable and that measures any inconsistencies in the cable. The pulse is reflected back to accurately determine where a break or other problem is in the cable. The TDR devices greatly reduce the time that would otherwise be needed to physically locate problems in the cable.

Figure 5:
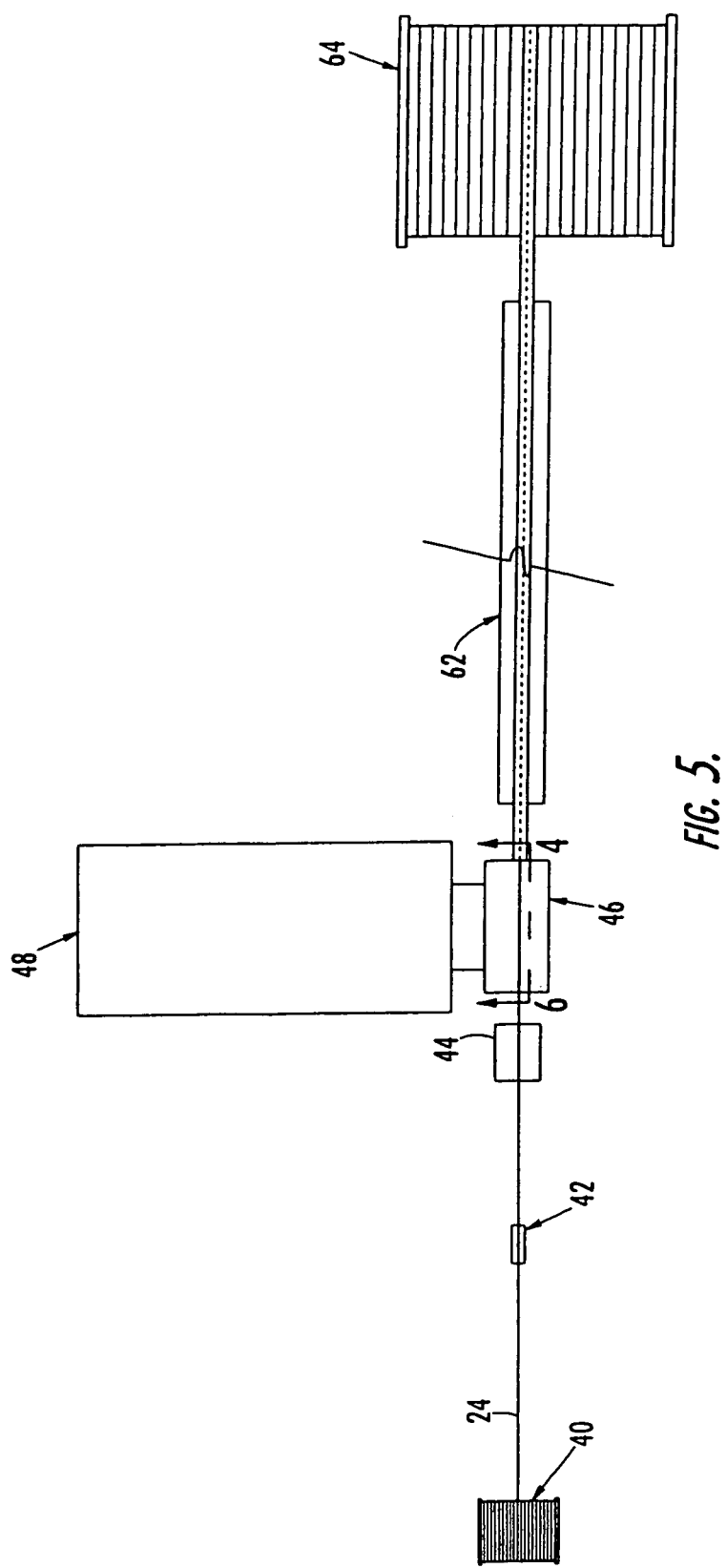
FIG. 5 schematically illustrates a method of making toneable conduit corresponding to a preferred embodiment of the invention.

FIG. 5 illustrates the preferred method embodiment for producing the toneable conduit of the invention. As shown in FIG. 5, the wire 24 is taken from a supply reel 40 and is fed through a wire guide 42. The wire 24 then passes through a lubrication apparatus 44 that lubricates the wire for further downstream processing. The lubricated wire 24 then advances into a crosshead 46, which communicates with an extruder apparatus 48 via a flow channel (not shown). Although not illustrated in FIG. 5, a second wire 32 or a twisted pair of wires 34 can also be taken from a supply reel (not shown), fed through a wire guide, lubricated and advanced into the crosshead 46 in the manner described herein with respect to the wire 24 to produce the toneable conduits illustrated in FIGS. 3 and 4.

The polymeric materials and any additives such as colorants that are used to form the elongate polymeric tube 10 (and stabilizing rib 20) are fed to the extruder apparatus 48, e.g., through a hopper (not shown). In the preferred embodiment of the invention, the polymeric materials include HDPE as discussed above. The extruder apparatus 48 operates at an elevated temperature above the melting temperature of the polymeric materials used to form the elongate polymeric tube 10 to provide a polymer melt. For example, in the preferred embodiment of the invention wherein the conduit is formed of HDPE, the extruder apparatus 48 is operated at a temperature of from about 300° F. to about 500° F.

Figure 6:
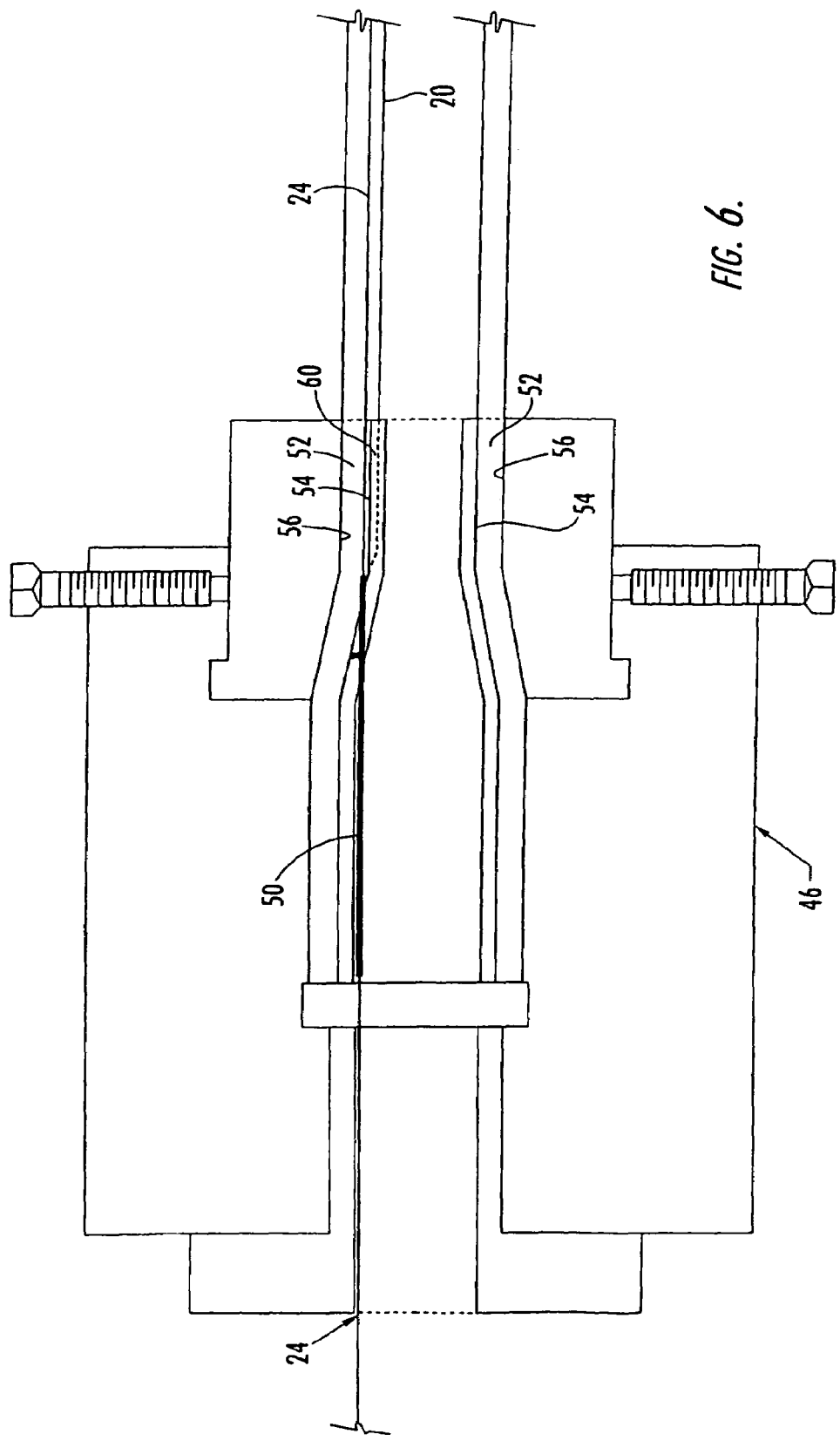
FIG. 6 is a cross-sectional view along line 4-4 of FIG. 3 illustrating the interior of the crosshead used to form the conduit according to the preferred embodiment of the invention.

FIG. 6 illustrates the formation of the conduit of the invention in more detail. A wire guide tube 50 delivers the wire 24 to an annular gap 52 between a tip 54 and a die 56 of the crosshead 46 while the extruder apparatus 48 delivers the polymer melt to the annular gap through a flow channel (not shown). The tip 54 and the die 56 form the annular gap 52 and shape the polymer melt into a tubular configuration to form the elongate polymeric tube 10. In particular, the tip 54 provides the shape of the interior surface 16 of the elongate polymeric tube 10 while the die 56 provides the shape of the exterior surface 18 of the elongate polymeric tube. A groove 60 provided in the tip 54 forms the stabilizing rib 20 in the conduit. Although not shown, additional grooves can be provided in the tip 54 to provide additional ribs along the interior surface 16 of the elongate polymeric tube 10 to facilitate the installation of cable in the conduit. The polymer melt forms around the wire 24 and the wire becomes embedded in the wall 12 of the elongate polymeric tube 10. The coating composition layer 30 on the wire 24 and the lubricant applied to the wire advantageously prevent the wire 24 from sticking to the polymer melt and facilitate the formation of the conduit of the invention.

Referring again to FIG. 5, the conduit leaves the crosshead 46 and advances to a cooling trough 62 that utilizes water to cool the conduit to allow it to harden. The conduit is then advanced to a take-up reel 64. The conduit can be stored or shipped on the take-up reel 64 and can readily be installed by unwinding the conduit from the take-up reel.

As mentioned above, the conduit of the invention can be readily coupled with other conduit. In particular, as shown in FIG. 7, the wire 24 can be torn out through the exterior surface 18 of the elongate polymeric tube 10 by applying a force on the wire perpendicular to the axis A in a direction 62. As discussed above, the preferred wire 24 used in accordance with the invention has sufficient tensile strength and elongation to tear through the HDPE conduit. Once the wire 24 is torn out through the conduit, the conduit can be coupled with an adjacent conduit.

Figure 8:
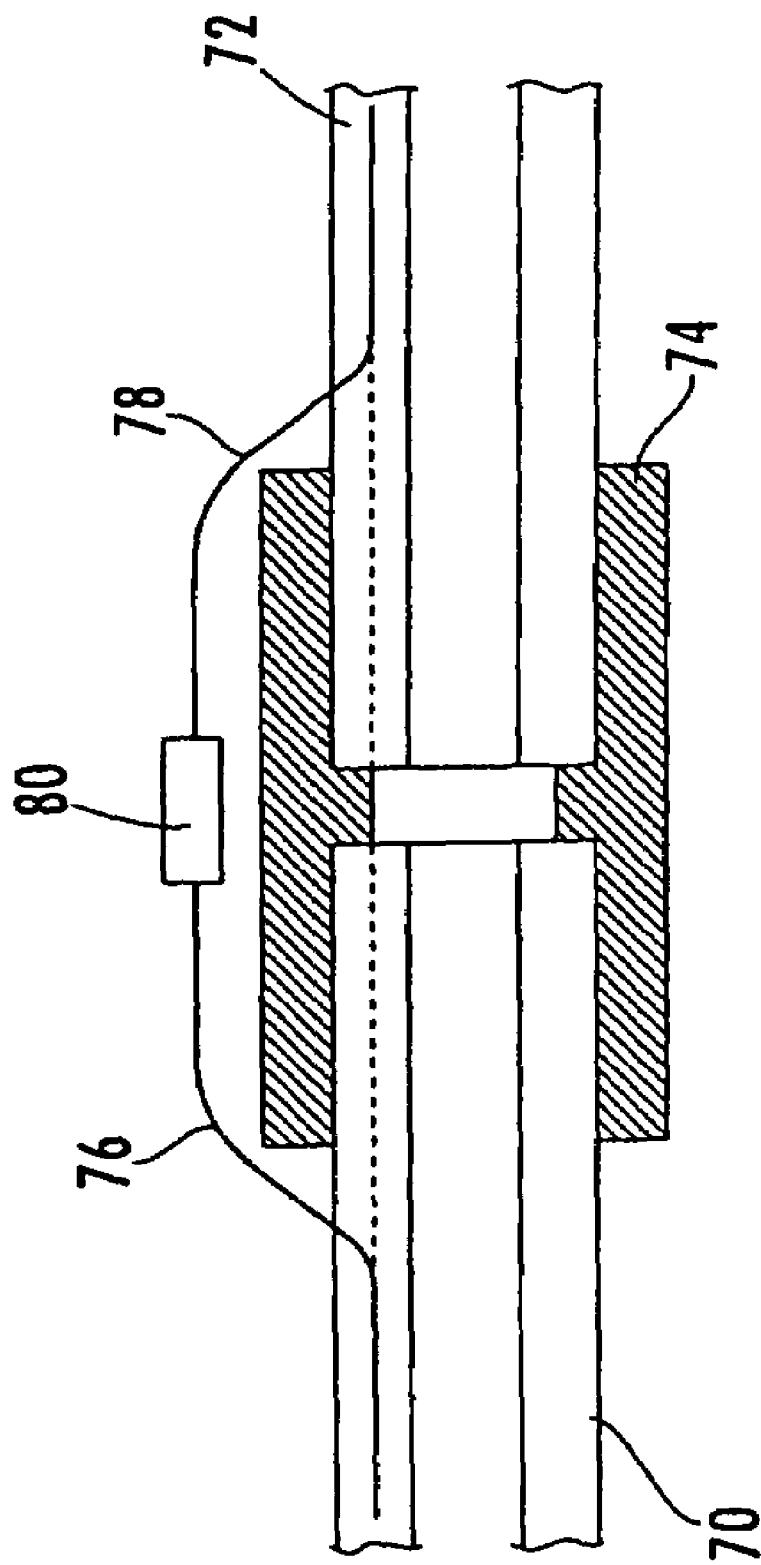
FIG. 8 is a side view of two adjacent coupled sections of conduit in accordance with the invention.

As shown in FIG. 8, a first conduit 70 is coupled with a second conduit 72. A conduit connector 74 is fitted onto the first conduit 70 and the second conduit 72 to provide a connection between adjacent segments of conduit. A wire 76 torn out of the first conduit 70 and a wire 78 torn out of the second conduit 72 are electrically connected or coupled together through the use of a suitable device such as the electrical connector 80. If the first conduit 70 and the second conduit 72 include a wire 32 or a twisted pair of wires 34 as illustrated in FIGS. 3 and 4, the wire or twisted pair of wires can also be torn through the conduits and electrically connected in the manner described with respect to the wires 76 and 78. In accordance with the invention, because the conduit of the invention has a smooth exterior surface, the conduit connector 74 fits flush to the exterior surfaces of the first conduit 70 and second conduit 72. As is understood in the art, the first conduit 70, second conduit 72, conduit connector 74, wire 76, wire 78 and electrical connector 80 can optionally be wrapped by a shrink wrap film that is heated to allow it to shrink around the conduit to prevent the ingress of moisture into the conduit along the conduit connector 74.

The conduit of the invention can advantageously be detected with conventional toning equipment used in the art. In particular, when the conduit of the invention is buried underground, even if it is empty or contains a non-metallic cable, it can be detected by toning equipment by transmitting a signal along the wire 24 and detecting the signal from the ground surface. As a result, the conduit of the invention can be detected at levels at deep as 10 feet underground or even at greater depths through the use of toning equipment. Moreover, the conduit of the invention can also be detected by metal detecting equipment at the lower underground depths (e.g. 3-5 feet) where those types of devices are useful. In addition to being detectable by toning equipment, i.e., toneable, because the conduit of the invention can be readily coupled as discussed above, the conduit of the invention can be detected underground over extended lengths, e.g., 5 to 10 miles, as desired in the art. Furthermore, the conduit can include a wire 32 or a twisted pair of wires 34 and can be used to provide a return path for signals to determine if damage points exist along the cable.

It is understood that upon reading the above description of the present invention and reviewing the accompanying drawings, one skilled in the art could make changes and variations therefrom. These changes and variations are included in the spirit and scope of the following appended claims.

That which is claimed:

1. A toneable conduit, comprising:
   an elongate polymeric tube having a wall with an interior surface, an exterior surface, and a predetermined wall thickness; and a first channel extending longitudinally within the wall of the elongate polymeric tube; and
   a continuous wire coincident with the first channel in the elongate polymeric tube, said wire being coated with a coating composition that prevents the wire from adhering to the polymer melt used to form the polymeric tube;
   said continuous wire capable of transmitting a toning signal to allow the conduit to be detected by toning equipment and capable of being torn out of the polymeric tube and remaining continuous to allow the conduit and wire to be coupled.

2. The toneable conduit according to claim 1, further comprising a first stabilizing rib extending longitudinally along the interior surface of the wall of the elongate polymeric tube and located radially inward from said channel.

3. The toneable conduit according to claim 2, further comprising at least one additional rib extending longitudinally along the interior surface of the elongate polymeric tube to facilitate the installation of cable within the conduit.

4. The toneable conduit according to claim 1, wherein the coating composition is formed of a polymeric material selected from the group consisting of fluoropolymers, polyamides, polyesters, polycarbonates, polypropylene, polyurethanes, polyacetals, polyacrylics, epoxies and silicone polymers.

5. The toneable conduit according to claim 4, wherein the coating composition is formed of a polymeric material that has a melting temperature of at least about 500°F.

6. The toneable conduit according to claim 5, wherein the coating composition is formed of polytetrafluoroethylene.

7. The toneable conduit according to claim 1, wherein the continuous wire has a tensile strength of at least about 150 lbs.

8. The toneable conduit according to claim 7, wherein the continuous wire is selected from the group consisting of copper-clad steel wire, copper-clad aluminum wire, copper wire, and tin copper wire.

9. The toneable conduit according to claim 7, wherein the continuous wire is copper-clad steel wire.

10. The toneable conduit according to claim 7, wherein the continuous wire has a diameter of from about 0.32 mm to about 2.59 mm.

11. The toneable conduit according to claim 1, wherein the exterior surface of the tube is smooth.

12. The toneable conduit according to claim 1, further comprising a second channel extending longitudinally within the wall of the elongate polymeric tube and a conductor selected from the group consisting of a continuous wire and a twisted pair of continuous wires coincident with the second channel in the elongate polymeric tube.

13. The toneable conduit according to claim 12, further comprising:
    a first stabilizing rib extending longitudinally along the interior surface of the wall of the elongate polymeric tube and located radially inward from said first channel; and
    a second stabilizing rib extending longitudinally along the interior surface of the wall of the elongate polymeric tube and located radially inward from the second channel.

14. A toneable conduit, comprising:
    an elongate polymeric tube formed of high density polyethylene having a wall with an interior surface, an exterior surface, and a predetermined wall thickness; a channel extending longitudinally within the wall of the elongate polymeric tube; and a stabilizing rib extending longitudinally along the interior surface of the wall of the elongate polymeric tube and located radially inward from said channel; and
    a continuous, copper-clad steel wire coincident with the channel in the elongate polymeric tube, said copper-clad steel wire coated with polytetrafluoroethylene to prevent the wire from adhering to the polymer melt used to form the polymeric tube;
    said copper-clad steel wire capable of transmitting a toning signal over long distances to allow the conduit to be detected by toning equipment and capable of being torn out of the polymeric tube and remaining continuous to allow the conduit and wire to be coupled.

15. A toneable conduit, comprising:
    an elongate polymeric tube having a wall with an interior surface and an exterior surface; and a first channel extending longitudinally within the wall of the elongate polymeric tube; and
    a continuous wire coincident with the first channel in the elongate polymeric tube;
    said continuous wire being a toning signal wire allowing the conduit to be detected by toning equipment and said wire capable of being torn out of the polymeric tube and remaining continuous to allow the conduit and wire to be coupled.

16. The toneable conduit according to claim 15, further comprising a first stabilizing rib extending longitudinally along the interior surface of the wall of the elongate polymeric tube and located radially inward from said channel.

17. The toneable conduit according to claim 16, further comprising at least one additional rib extending longitudinally along the interior surface of the elongate polymeric tube to facilitate the installation of cable within the conduit.

18. The toneable conduit according to claim 15, wherein the continuous wire has a tensile strength of at least about 150 lbs.

19. The toneable conduit according to claim 18, wherein the continuous wire is selected from the group consisting of copper-clad steel wire, copper-clad aluminum wire, copper wire, and tin copper wire.

20. The toneable conduit according to claim 18, wherein the continuous wire is copper-clad steel wire.

21. The toneable conduit according to claim 18, wherein the continuous wire has a diameter of from about 0.32 mm to about 2.59 mm.

22. The toneable conduit according to claim 15, wherein the continuous wire is selected from the group consisting of copper-clad steel wire, copper-clad aluminum wire, copper wire, and tin copper wire.

23. The toneable conduit according to claim 15, wherein the continuous wire is copper-clad steel wire.

24. The toneable conduit according to claim 15, wherein the continuous wire has a diameter of from about 0.32 mm to about 2.59 mm.

25. The toneable conduit according to claim 15, wherein the wall has a predetermined thickness.

26. The toneable conduit according to claim 25, wherein the exterior surface of the tube is smooth.

27. The toneable conduit according to claim 15, further comprising a second channel extending longitudinally within the wall of the elongate polymeric tube and a conductor selected from the group consisting of a continuous wire and a twisted pair of continuous wires coincident with the second channel in the elongate polymeric tube.

28. The toneable conduit according to claim 27, further comprising:
- a first stabilizing rib extending longitudinally along the interior surface of the wall of the elongate polymeric tube and located radially inward from said first channel; and
- a second stabilizing rib extending longitudinally along the interior surface of the wall of the elongate polymeric tube and located radially inward from the second channel.

29. A toneable conduit, comprising:
- an elongate polymeric tube formed of high density polyethylene having a wall with an interior surface, an exterior surface, and a predetermined wall thickness; a channel extending longitudinally within the wall of the elongate polymeric tube; and
- a continuous, copper-clad steel wire coincident with the channel in the elongate polymeric tube;
- said copper-clad steel wire being a toning signal wire allowing the conduit to be detected by toning equipment and said wire capable of being torn out of the polymeric tube and remaining continuous to allow the conduit and wire to be coupled.

30. The toneable conduit according to claim 29, wherein said polymeric tube further comprises a stabilizing rib extending longitudinally along the interior surface of the wall of the elongate polymeric tube and located radially inward from said channel.

31. The toneable conduit according to claim 29, wherein said copper-clad steel wire is coated with polytetrafluoroethylene.

32. A toneable conduit, comprising:
- an elongate polymeric tube having a wall with an interior surface and an exterior surface; and a first channel extending longitudinally within the wall of the elongate polymeric tube; and
- a continuous wire coincident with the first channel in the elongate polymeric tube, said wire being coated with a coating composition that prevents the wire from adhering to the polymer melt used to form the polymeric tube;
- said continuous wire being a toning signal wire allowing the conduit to be detected by toning equipment and said wire capable of being torn out of the polymeric tube and remaining continuous to allow the conduit and wire to be coupled.

33. A toneable conduit, comprising:
- an elongate polymeric tube having a wall with an interior surface, an exterior surface, and a first channel extending longitudinally within the wall of the elongate polymeric tube; and
- a continuous wire having a tensile strength of at least about 150 lbs coincident with the first channel in the elongate polymeric tube;
- said continuous wire being a toning signal wire allowing the conduit to be detected by toning equipment.

* * * * *